United States Patent

Schutz

[11] Patent Number: 5,556,494
[45] Date of Patent: Sep. 17, 1996

[54] PROCESS FOR MANUFACTURING AND RECONDITIONING A REUSABLE BARREL OF SYNTHETIC RESIN

[76] Inventor: Udo Schutz, Ruckersteg 4, 56242 Selters, Germany

[21] Appl. No.: 374,076

[22] Filed: Jan. 19, 1995

Related U.S. Application Data

[62] Division of Ser. No. 166,843, Dec. 15, 1993.

[30] Foreign Application Priority Data

Dec. 16, 1992 [DE] Germany ............... 42 42 370.8

[51] Int. Cl.$^6$ ............... B29C 65/18; B65B 7/00
[52] U.S. Cl. ............... 156/69; 156/304.5; 156/304.6
[58] Field of Search ............... 156/69, 304.5, 156/304.6, 308.4, 309.6, 309.9; 220/254

[56] References Cited

U.S. PATENT DOCUMENTS

| | | | |
|---|---|---|---|
| 4,201,306 | 5/1980 | Dubois | 156/69 |
| 4,222,974 | 9/1980 | Smith | 156/69 |
| 4,232,622 | 11/1980 | Weierman | 156/69 |
| 4,726,866 | 2/1988 | Van Keimpema | 156/69 |
| 4,919,987 | 4/1990 | Manner | 156/304.5 |
| 4,962,862 | 10/1990 | Farrington | 220/356 |
| 5,074,428 | 12/1991 | Wildfeuer | 220/322 |

FOREIGN PATENT DOCUMENTS 3539656  5/1987  Germany.
8810760.4 12/1988 Germany.
3937613  5/1991  Germany.

*Primary Examiner*—Daniel J. Stemmer
*Attorney, Agent, or Firm*—Young & Thompson

[57] ABSTRACT

For producing the bunghole barrel (1) utilized as a multiple-trip barrel, a continuously extending heating tool is placed under pressure on the border (18) of the barrel body (2) from above, and a bunghole lid (6) with an annular extension (23) molded onto the underside of the lid flange (17) and coaxial to the lid axis is placed under pressure on the heating tool. After a heating-up period for superficially melting the annular extension (23) on the lid flange (17) and a continuous annular bead (26) molded to the barrel border (18), the lid (6) and the heating tool are lifted off. Subsequently, the lid (6) is placed with the annular extension (23) under pressure and pretensioning of the lid gasket (16) on the barrel border (18) in such a way that the annular extension (23) on the lid flange (17) is welded to the annular bead (26) on the barrel border (18) to form an annular sealing web (20) joining the lid flange (17) and the barrel border (18). After one-time or multiple usage, for reconditioning the bunghole (1), the bunghole lid (6) is separated from the widemouthed barrel body (2) by removal of the sealing web (20). The barrel body (2) can then be retrofitted to a widemouthed barrel with a simple lid and a clamping-ring closure of sheet metal, or as a lidded bunghole barrel or bunghole barrel can be provided with a welded-on or molded-on bunghole lid.

1 Claim, 4 Drawing Sheets

1

PROCESS FOR MANUFACTURING AND RECONDITIONING A REUSABLE BARREL OF SYNTHETIC RESIN

This application is a division of application Ser. No. 08/166,843, filed Dec. 15, 1993, pending.

FIELD OF THE INVENTION

The invention relates to multiple-trip barrels of synthetic resin with a blow-molded barrel body exhibiting a solid border projecting at a spacing below the barrel opening from the barrel wall radially toward the outside, as well as with an injection-molded plastic lid with an outer rim encompassing the barrel neck and an inner rim dipping into the barrel neck and projecting beyond the lid bottom below the barrel opening, and with a sealing ring inserted between the lid outer rim and the lid inner rim, this sealing ring being urged by a lid closure against the opening rim of the barrel neck (DE 39 37 613 Al).

BACKGROUND OF THE INVENTION

The strict legal environmental protection rules necessitate the transition from disposable to reusable barrel units, such as, for example, barrels of plastic or steel. The changeover to barrel units having a larger volume with the objective of reducing the residual amounts, and the development of novel multiple-trip barrel units which can be reconditioned with a view toward ridding the environment of harmful substances and which can be optimally emptied of residue and can readily be cleaned for purposes of reconditioning as well as for a proper waste disposal by nonpolluting destruction, e.g. by combustion, or for reprocessing of the manufacturing material is desirable.

The development of reconditionable and easily disposable solid barrel units protected against contamination by deleterious substances, essentially barrels of plastic and steel, resulted in the lid-equipped barrels of this type and in lid-spigoted barrels known, for example, from DE 35 39 656 Al replacing, in part, the heretofore utilized sealed bunghole barrels. These barrels are equipped, as needed, with a flexible inside sheath denoted as inliner or, respectively, with a bag of a synthetic resin sheeting, e.g. a polyethylene sheet, or of a diffusion-proof, co-extruded metal-plastic composite sheet, for example an aluminum foil laminated on both sides with polyethylene. Barrels with an inliner are known, for example, from DE 88 10 760 U1. The inliners are used with plastic and steel barrels in case these are filled with products causing problems in their disposal, such as dispersions, e.g. paints, which can hardly be removed any more from the barrel wall after drying. Inliners of a diffusion-proof composite sheeting prevent in case of plastic barrels the diffusion of solvent-containing filling material into the barrel wall and a possible rediffusion of solvents from the barrel wall. In case of steel barrels, the inner liner saves the internal varnishing heretofore required for protecting the steel sheet against aggressive media and corrosion.

SUMMARY OF THE INVENTION

The invention is based on the object of developing a multiple-trip barrel which, after use as a sealed bunghole barrel, can be economically reconditioned to a widemouthed lidded barrel or once again to a bunghole barrel.

The combination of a blow-molded widermouthed barrel body with an injection-molded bunghole lid attached to this body by pressure molding or peripheral molding opens up the possibility of an economical production of bunghole barrels satisfying the highest safety requirements for liquid hazardous material; these bunghole barrels can be retrofitted, by economical reconditioning, into widemouthed barrels with removable simple lid or bunghole lids with a clamping-ring closure for the transport and the storage of liquid, granular, or pulverulent goods classified as lower hazard grades.

BRIEF DESCRIPTION OF THE DRAWINGS

The multiple-trip plastic barrel and the processes for its manufacture and reconditioning according to the invention will be described below with reference to drawings wherein.

DETAILED DESCRIPTION OF THE INVENTION

Figure 1:
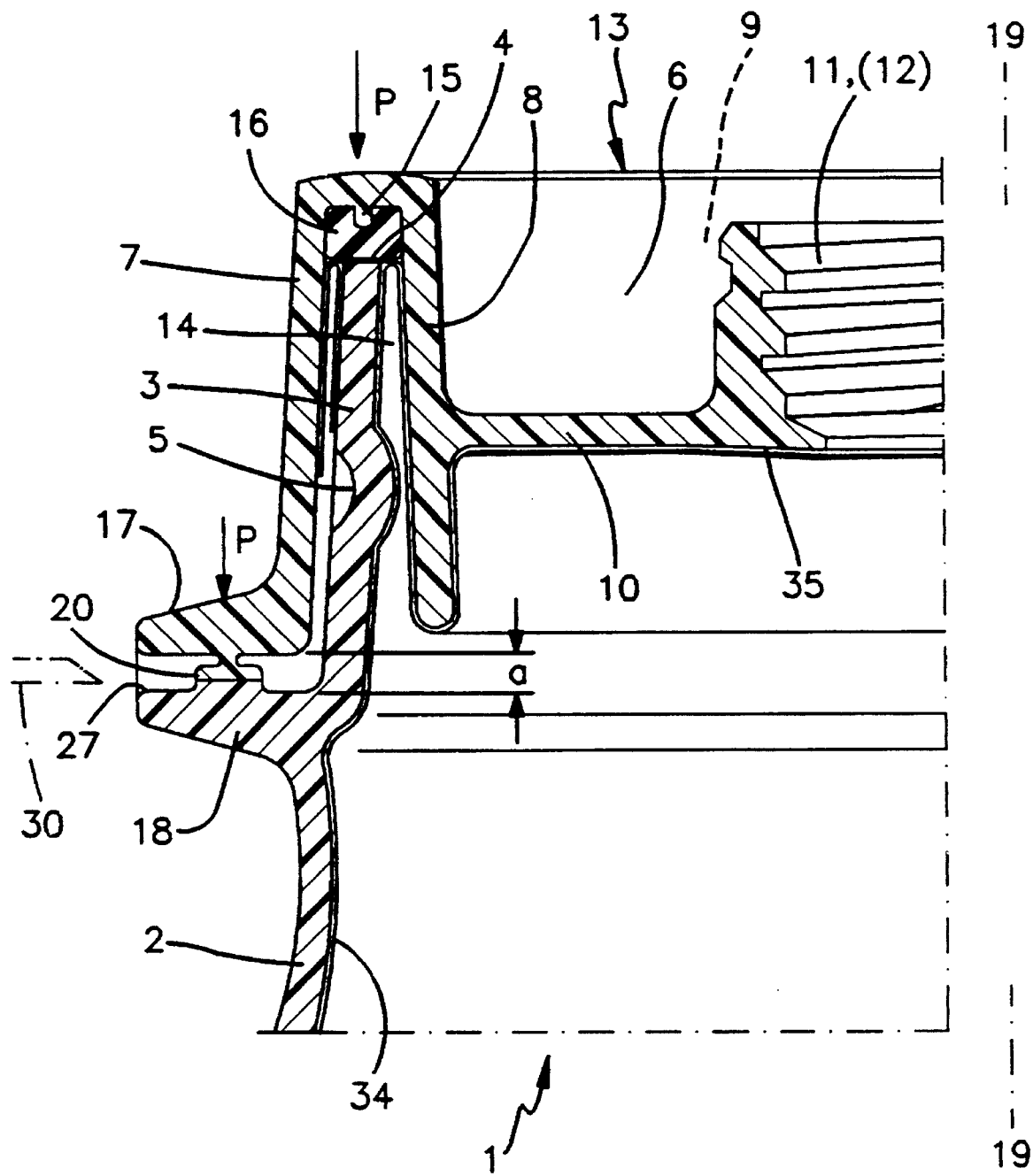
FIG. 1 shows a fragmentary sectional view of the lid region of a first embodiment of a bunghole barrel with a bunghole lid attached by pressure welding.

The bunghole barrel 1 of a thermoplastic synthetic resin, for example polyethylene, according to FIG. 1, used as a multiple-trip barrel, comprises a blow-molded widemouthed barrel body 2 with a barrel neck 3 into which are molded, at a spacing from the opening rim 4, corrugations 5 distributed over the circumference for rigidifying the barrel neck 3 and for supporting a bunghole lid 6 injection-molded of plastic. The bunghole lid 6 has an outer rim 7 encompassing the barrel neck 3 and an inner rim 8 dipping into the barrel neck 3 projecting beyond the lid bottom 10 located below the barrel opening 9. The bunghole lid 6 dips with its bottom 10 so deeply into the barrel neck 3 that the filling and emptying bunghole 11 and the aerating and venting, bunghole 12, molded onto the lid bottom 10, terminate below the plane of the upper lid rim 13. The outer rim 7 and the inner rim 8 of the lid form an annular space 14, an annular extension 15 projecting axially from the bottom of this space. The annular extension 15 is surrounded by a molding of a bicomponent sealing compound, for example polyurethane with a curing agent, constituting a sealing ring or lid gasket 16.

At the bottom of the outer rim 7 of the injection-molded bunghole lid 6, a continuously extending flange 17 is molded on, and a solid border 18 is molded to the blow-molded barrel body 2, this border projecting radially toward the outside at a spacing below the barrel opening 9.

The lid flange 17 and the barrel border 18, having a spacing a when the lid 6 is closed, are welded together by a continuous sealing web 20 coaxial to the barrel axis 19—19.

Figure 2:
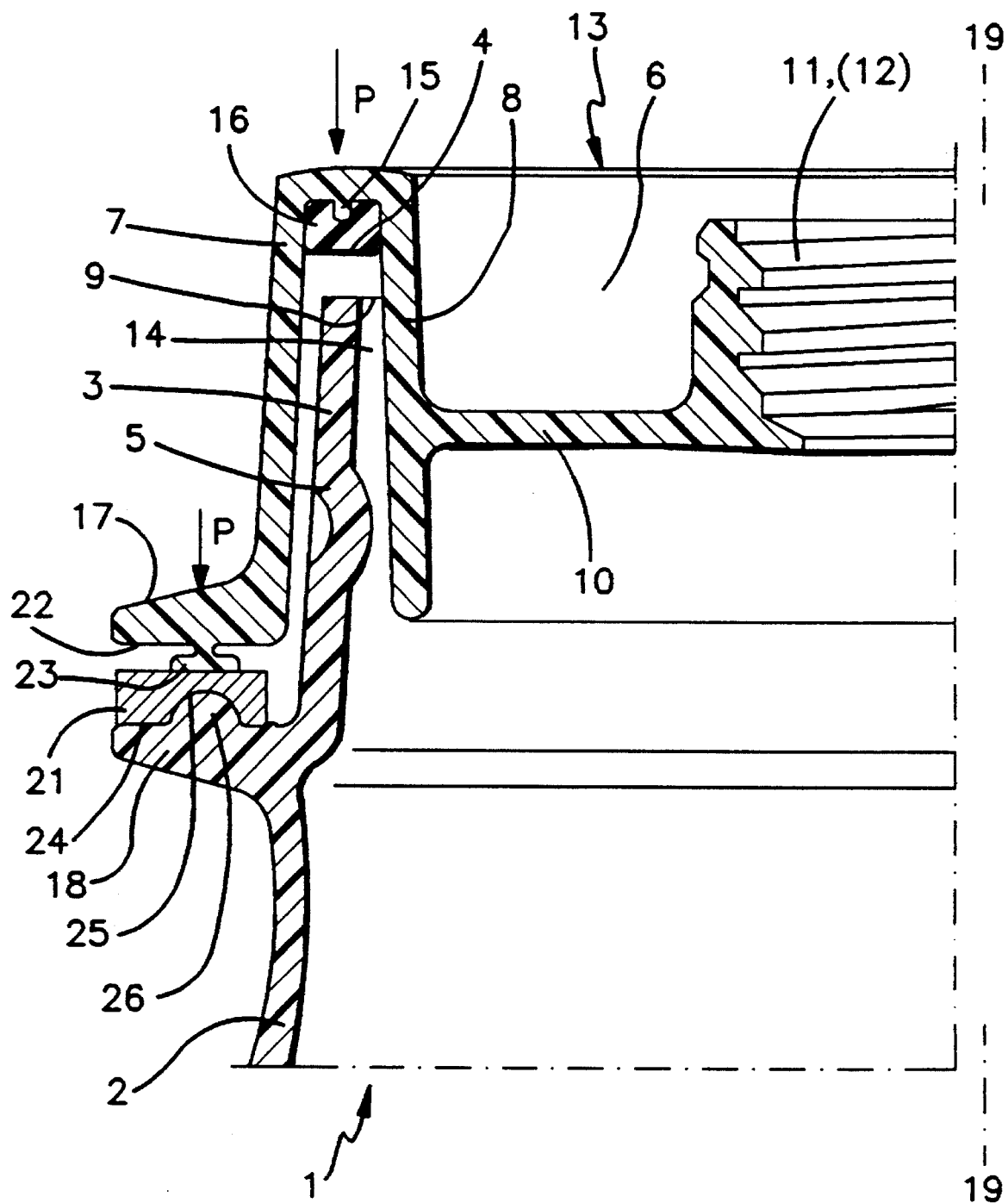
FIG. 2 shows an illustration of the lid region corresponding to FIG. 1 with a heating tool to prepare for a pressure welding step.

In order to produce the bunghole barrel 1 of FIG. 1, a continuously extending heating tool 21 is placed according to FIG. 2 on the border 18 of the barrel body 2 from above, and the bunghole lid 6 is placed on the heating tool with an annular extension 23 molded to the underside 22 of the lid flange 17 and coaxial to the lid or barrel axis 19—19, with a specific pressure force P. A continuously extending annular groove 25 is formed in the underside 24 of the heating tool 21. During a heating-up period, molten plastic material of the barrel border 18 rises into the annular groove 25 of the heating tool 21 due to the pressure acting on the heating tool 21 and forms a continuous annular bead 26 lying in opposition to the annular extension 23, and the annular extension 23 molded to the lid flange 17 is superficially melted. After the heating-up period, the bunghole lid 6 and the heating tool 21 are lifted off the barrel body 2, and then the lid 6 with the annular extension 23 is placed under pressure and pretensioning of the lid gasket 16 onto the barrel border 18 in such a way that the annular extension 23 on the underside 22 of the lid flange 17 is welded to the annular bead 26 on the topside 27 of the barrel border 18 to form an annular sealing web 20 joining the lid flange 17 and the barrel border 18.

In a modification of the above-described production process, the annular bead 26 can be blow-molded to the barrel border 18.

Furthermore, there is the possibility of welding the lid flange 17 and the barrel border 18 to each other solely via the annular extension 23.

Figure 3:
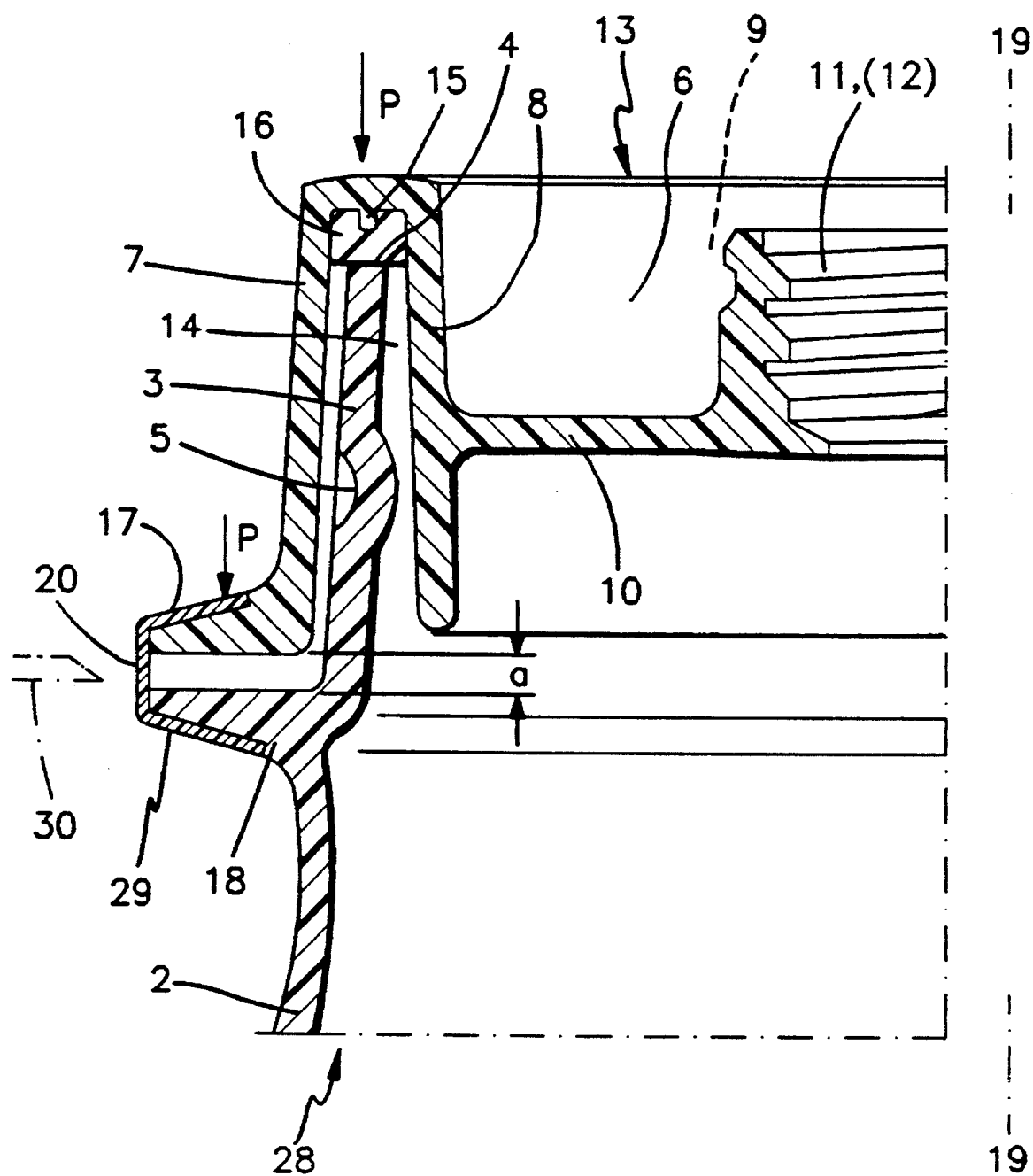
FIG. 3 shows a fragmentary sectional view of the lid region of a second embodiment of a bunghole barrel equipped with a locking ring injection-molded of synthetic resin.

In order to manufacture the bunghole barrel 28 according to FIG. 3, a bunghole lid 6 is placed on the barrel neck 3 with a pressure force P and with pretensioning of the lid gasket 16, and the lid flange 17 and the barrel border 18, arranged one above the other at a spacing a, are surrounded with a molded-on locking ring 29 of plastic, this locking ring forming an annular sealing web 20 joining the lid flange 17 and the barrel border 18. The synthetic resin material for the locking ring 29 is most advantageously injected tangentially into an appropriate injection-molding tool.

After initial or multiple use, the bunghole lid 6, for reconditioning the bunghole barrels 1, 28 according to FIGS. 1 and 3, is separated from the widemouthed barrel body 2 by removing the sealing web 20 by means of one or several blades 30 of a cutting machine, forming turning chisel, a saw, or the like. The barrel body 2 can then be retrofitted to a widemouthed barrel 31 with a simple lid 32 and a clamping-ring closure 33 of sheet metal according to FIG. 4, or it can be equipped as a lid bunghole barrel or bunghole barrel with a welded-on or molded-on bunghole lid.

Figure 4:
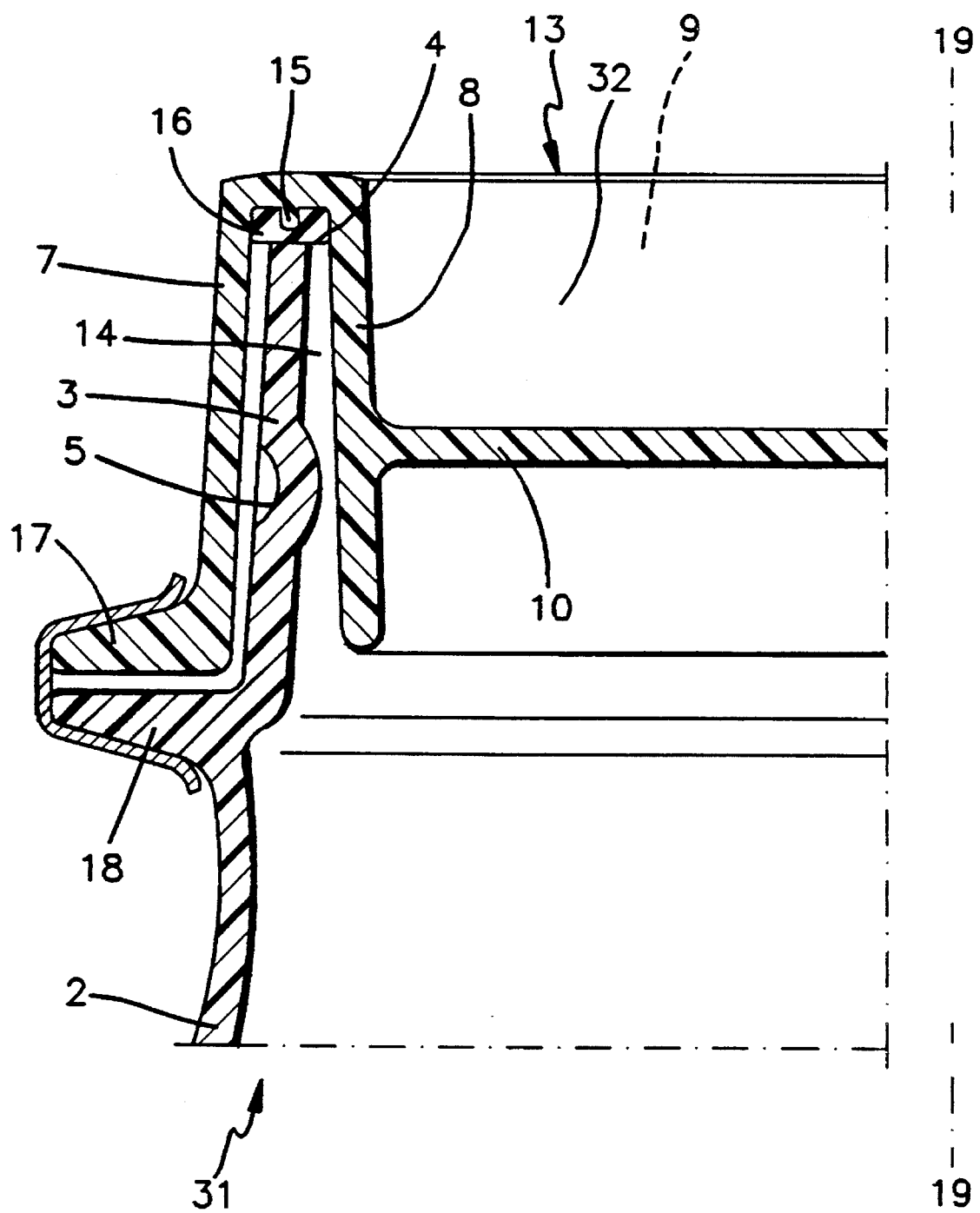
FIG. 4 is a fragmentary sectional view of the lid region of a barrel retrofitted from a bunghole barrel into a widemouthed lidded barrel after separation of the bunghole lid.

The bunghole barrels 1, 28 according to FIGS. 1 and 3, as well as the widemouthed lidded barrel 31 of FIG. 4 can be provided with a film bag 34 of synthetic resin sheeting, also called inliner, or with a metal-plastic composite sheeting. This film bag 34, illustrated with the bunghole barrel 1 of FIG. 1, is inserted in the barrel body 2 prior to the attachment, by welding or molding, of a bunghole lid 6 and prior to the attachment of a widemouthed barrel lid 32 to the barrel neck 3, and is pulled over the opening rim 4 so that the inliner is clamped in between the opening rim and the lid gasket 16. Additionally, the film bag 34 can be tacked to the inner wall of the barrel body 2 by means of an adhesive or by thermo-welding at certain spots.

Finally, the bunghole lid 6 of the bunghole barrels 1,28 according to FIGS. 1 and 3, as well as the lid 32 of the widemouthed barrel 31 of FIG. 4 can be equipped with an internal cover 35 of a synthetic resin sheeting or a metal-plastic composite sheet, this cover 35 being illustrated with the bunghole barrel 1 of FIG. 1.

What is claimed is:

1. Process for the production of reusable barrels of synthetic resin, said process comprising:

placing a continuously extending heating tool onto a border of a barrel body, said heating tool having a continuous annular groove disposed in the underside surface of the heating tool, placing a bunghole lid having a lid flange with an annular extension molded to the underside of the lid flange on said heating tool, said annular extension being coaxial to the lid axis, applying pressure to said lid, heating for a sufficient period of time to melt the annular extension and to form a continuous annular bead in the topside of the barrel border, lifting the lid and the heating tool from the barrel border, and thereafter, placing the lid with the annular extension under pressure onto the barrel border such that the annular extension is welded to the annular bead and forms an annular sealing web joining the lid flange and the barrel border.

\* \* \* \* \*